United States Patent [19]

Hamar

[11] Patent Number: 5,576,826
[45] Date of Patent: Nov. 19, 1996

[54] ALIGNMENT LASER WITH OVER-FLOODED APERTURE SYSTEM AND DUAL-MODE SELF-CENTERING TARGET

[75] Inventor: Martin R. Hamar, Wilton, Conn.

[73] Assignee: Hamar Laser Instruments, Inc., Wilton, Conn.

[21] Appl. No.: 434,522

[22] Filed: May 3, 1995

[51] Int. Cl.⁶ .................................................. G01B 11/27
[52] U.S. Cl. ............................... 356/138; 356/153; 33/286
[58] Field of Search ...................................... 356/399, 138, 356/153–154; 33/286, 234, 520, 529, 293, 296

[56] References Cited

U.S. PATENT DOCUMENTS

| | | |
|---|---|---|
| 3,742,581 | 7/1973 | Roodvoels .................. 356/153 |
| 4,045,129 | 8/1977 | Hamar . |
| 4,218,923 | 8/1980 | Triplett et al. . |
| 4,281,929 | 8/1981 | Lord et al. . |
| 4,297,031 | 10/1981 | Hamar . |
| 4,382,680 | 5/1983 | Hamar . |
| 4,468,119 | 8/1984 | Hamar . |
| 4,483,618 | 11/1984 | Hamar . |
| 4,521,968 | 6/1985 | Wiltermood et al. ............ 33/286 |
| 4,523,640 | 6/1985 | Wilson et al. . |
| 4,679,940 | 7/1987 | Hamar . |
| 4,681,439 | 7/1987 | Shoemaker ..................... 356/154 |
| 4,714,344 | 12/1987 | Hamar . |
| 4,843,896 | 7/1989 | Napeloni et al. . |
| 4,844,618 | 7/1989 | Hamar . |
| 4,967,092 | 10/1990 | Fraignier et al. . |
| 5,461,793 | 10/1995 | Melville ........................... 356/153 |

*Primary Examiner*—Samuel A. Turner
*Attorney, Agent, or Firm*—Anthony J. Casella; Gerald E. Hespos

[57] ABSTRACT

A device for aligning and measuring a hollow, rotatable bore includes a laser beam source within a housing having an aperture in its front face for passing the beam. The housing is mounted at one end of the extruder bore to project the beam through the bore to be detected by a target at the opposite end. The diameters of the aperture and bore are concentric and the laser beam defines an axis that is alignable with the axis of rotation of the rotatable member, using target signals, by vertical and horizontal displacement with micrometers disposed on the rear face of the laser housing. Various arrangements for mounting the housing on the extruder are disclosed. The target includes a sensing cell in a housing mounted in an adapter with four balls disposed on its periphery 90° apart. The housing orients the cell plane coincident with the plane of the four balls and the diameter at the four balls is dimensioned to exceed that of the bore to be measured so that the target member when tilted and inserted into the bore will jam into place at an angle. The four balls can be urged into contact with the inside diameter of the bore, resulting in a target that is self-centered. In another mode, the housing may be moved so that the cell plane is perpendicular to the axis of the bore to permit the diameter of the bore to be checked.

27 Claims, 5 Drawing Sheets

ALIGNMENT LASER WITH OVER-FLOODED APERTURE SYSTEM AND DUAL-MODE SELF-CENTERING TARGET

BACKGROUND OF THE INVENTION

1. Field of the Invention

The present invention relates to laser metrology and more particularly to a laser system for determining the alignment and measuring wear of machine parts such as the barrels or bores of extruders.

2. Description of the Prior Art

Various laser systems are known for measuring and aligning machine parts and assemblies. Systems of this type are disclosed in applicant's U.S. Pat. Nos. 4,045,129; 4,297,031; 4,382,680; 4,483,618; 4,468,119; 4,679,940; 4,714,344; and 4,844,618. It is common in such systems, as in the system disclosed, for example, in U.S. Pat. No. 4,297,031, to require a number of setting-up operations involving centering the laser source and aligning the mounting parts and targets before beginning the actual assembling of machine parts, and their measuring and alignments. When working with machine parts having barrels and bores to be measured, it is desirable to fixture the laser and/or the target on the central axis of the bore or at some known distance from the centerline for properly performing the alignment. Various devices for monitoring or measuring the interiors of pipes and bores are disclosed in U.S. Pat. Nos. 4,218,923; 4,281,929; 4,523,640; 4,843,896; and 4,967,092. These devices typically involve a complex fixture for the laser or the target with arms or rods which expand in equal and opposite directions to center the laser or the target in the bore. These fixtures are mechanically complicated, with many parts that can cause inaccuracies, and include expensive components. Consequently, setting up and operating such systems can require trained technicians and time-consuming careful assembly and measurements as well as sophisticated and costly equipment. It is therefore a problem in the art to achieve fast and easy set-up and aligning when performing machine part alignment and centering operations and to accomplish it with uncomplicated and inexpensive instrumentation.

OBJECTS OF THE INVENTION

It is accordingly an object of the present invention to provide an improved laser device including a housing and mounting arrangement that obviates setting up operations and facilitates fast and easy alignment measurements.

It is another object of the invention to provide an improved laser alignment system including the improved laser device for straightness readings on alignments over considerable distances.

It is a further object of the invention to provide a laser and improved target arrangement that is simple to assemble and operate and versatile in application.

SUMMARY OF THE INVENTION

The present invention involves a laser metrology system for properly aligning machine parts and, in a preferred embodiment, for correcting the alignment of a machine member having at least one axial passageway, such as a spindle, a turbine, or an extruder barrel or bore. Accordingly, a laser source is disposed within a housing, readily mountable at one end of the passageway, and its beam is projected through the passageway for detection by a target disposed in its own housing and mountable at another location in the passageway or in a separate bore adjustably alignable with the passageway. The laser housing has a front face with an aperture through which the laser beam is directed. The aperture is smaller than the cross-section of the laser beam, and hence is "over-flooded" by the laser beam. Additionally the center of the aperture is disposed concentrically with the axis of the passageway. The laser beam defines an axis that is to be aligned with the axis of the passageway. Alignment of the laser beam with the axis of the passageway is measured by signals from the target. Micrometer components accessible through the rear face of the laser housing rotate an optical component within the laser housing for shifting the laser beam horizontally and/or vertically into alignment with the axis of the passageway. Various structures may be used to mount the laser housing at the passageway, e.g., magnets, or a flange, or a turning, that are disposed to hold the housing arrangement on the end member being aligned.

The target assembly includes a photosensitive cell capable of generating electrical signals indicative of the location at which a laser beam impinges. The cell may be secured in a target housing which, in turn, may be mounted on an adapter with four balls disposed on its outer periphery 90° apart with their centers disposed in a common plane. The target housing and the adapter may be oriented to position the center of the cell plane in the plane of the four balls and at the center of the diameters connecting opposed balls. The outside diameter defined by the adapter and the four balls is dimensioned to exceed the inside diameter of the barrel or bore to be aligned. Thus the adapter must be angularly rotated to fit in the bore and can be jammed into place urging the adapter toward an orthogonal alignment in the bore with the four balls making contact with the inside circumferential surface of the bore. In this mode the center of the photosensitive cell is self-centered in the bore. Variations in bore diameters will result in simply tilting the entire adapter at different angles, but the center of the photosensitive cell will always be centered. This permits the axis of the bore to be aligned with the axis of the laser beam.

In a preferred embodiment, the target housing may be reoriented on the adapter, so that the plane of the photosensitive cell is substantially perpendicular to the axis of the bore and in a plane coincident with a plane passing through the centers of two of the balls. In this arrangement the target may be used to measure variations in bore diameter. The mounting arrangement of the target housing to the adapter may be configured to easily switch the target assembly from the self-centering mode to the diameter measurement mode.

BRIEF DESCRIPTION OF THE DRAWINGS

The present invention will be described in more detail below with reference to the accompanying drawings in which.

DETAILED DESCRIPTION OF THE PREFERRED EMBODIMENT

Figure 1:
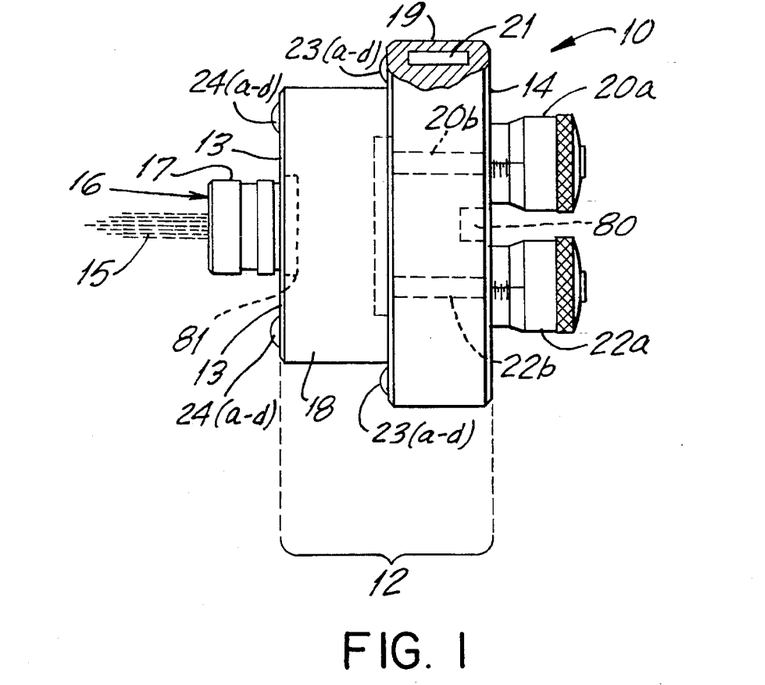
FIG. 1 is a side view of a laser device for use in accordance with the present invention.
Figure 2:
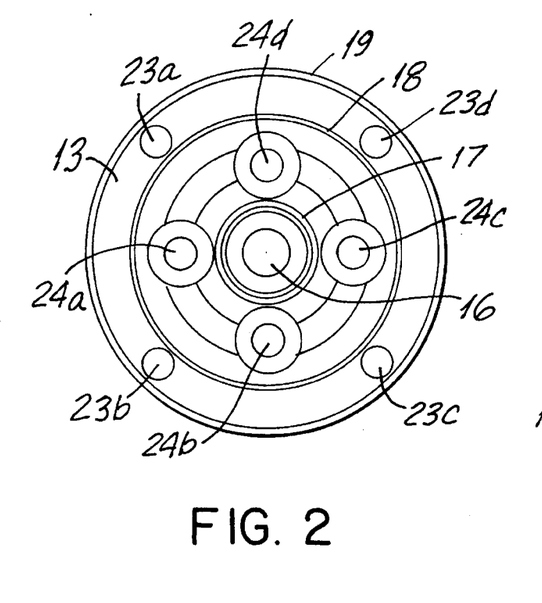
FIG. 2 is a front view of the laser device of FIG. 1 showing the locations on its face of inner and outer sets of magnets which may form one type of arrangement for mounting the device in a spindle or bore opening.
Figure 3:
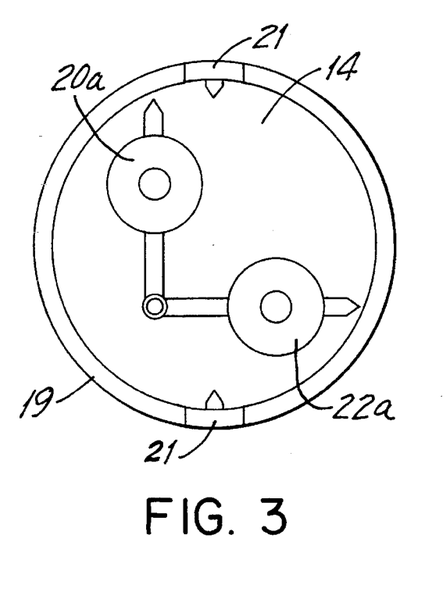
FIG. 3 is a rear view of the laser device of FIG. 1 showing micrometer setting knobs for vertically and horizontally adjusting the laser beam axis.

As seen in FIG. 1 an improved laser device 10 for use in a preferred system in accordance with the present invention is composed of a housing member 12 containing a laser source 80, e.g., a laser diode, along with a collimating lens 81, and an optical element 82. The housing 12 is preferably circular in form, having smaller and enlarged diameter portions 18 and 19, respectively, and the laser source 80 projects a laser beam 15 of oblong or elliptical cross-section through a round aperture 16 surrounded by a cylinder 17 on the front face 13 of the device 10. The aperture 16 is precision machined to be exactly concentric with the outside diameters of the housing 12, as shown in FIG. 2. The laser source 80 is disposed centrally therein to produce what may be referred to as an "over-flooded" aperture system, that is, the oblong or elliptical cross-section of the laser beam 15 defines dimensions which exceed the diameter of the aperture 16. The peripheral fringes of the laser beam 15 thus are eliminated, and the laser beam 15 is effectively rounded in passing through the round aperture 16. This arrangement obviates the need for complicated and expensive optics in producing a round beam or spot and tends to decouple shifting of the beam energy center upon relative displacement of the beam and aperture. The rear face 14 of the laser device 10 is formed on the enlarged diameter portion 19 of the housing 12 which may have two circular level vials 21 embedded 180° apart in its periphery. Two micrometers have their adjustment knobs 20a and 22a disposed on the rear face 14 and as indicated in FIG. 3 may be used for vertical and horizontal shifting, respectively, of the laser beam as will be described.

The front face 13 of the laser device 10 is also provided with suitable means for mounting the laser device at one end of a passageway that extends axially in a member that may be rotatable, such as an extruder barrel or bore or a spindle or turbine. The mounting means supports the laser device 10 at the passageway such that the laser beam 15 emerging from the aperture 16 is approximately concentric with that portion of the passageway. In FIG. 2, the mounting means are shown as comprising concentric sets of magnets, an outer set 23a, 23b, 23c, 23d and an inner set 24a, 24b, 24c, 24d, which preferably are of NdFeB.

Figure 4:
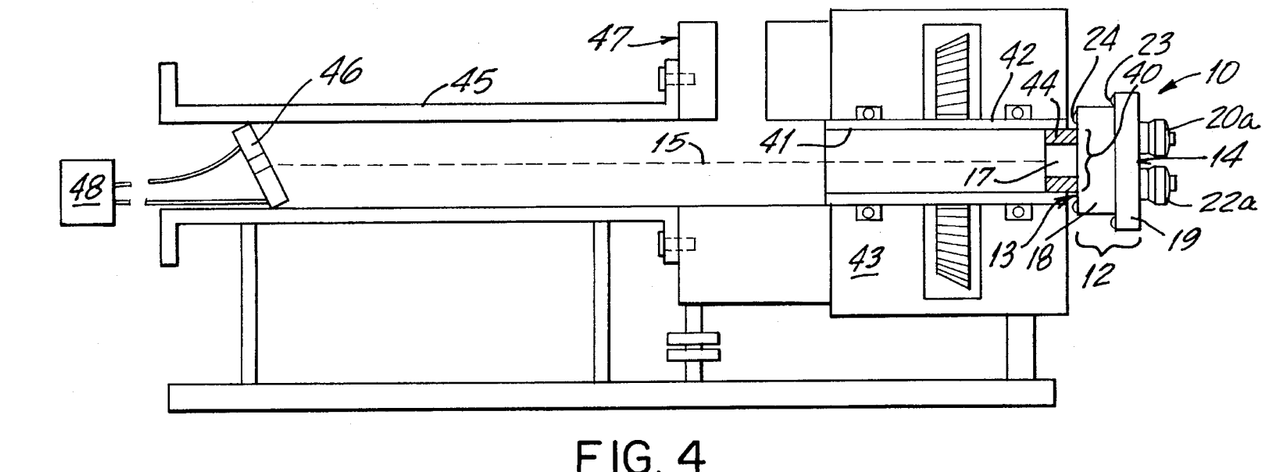
FIG. 4 is a diagram, partly in section, of a laser device being used in accordance with the invention to align an extruder barrel or bore, showing the laser device mounted, by means of the inner magnet arrangement of FIG. 2, on the drive shaft of the extruder to project the laser beam as the axis of rotation through the hollow output shaft of the drive gear box to a self-centering target located inside the barrel.

More particularly, referring to FIG. 4, the laser device 10 is shown magnetically mounted in the open end 40 of a round bore or tubular passageway 41 in the drive shaft 42 of an extruder gear box 43. The inner set of magnets, 24a–24d, on the front face 13 of the housing 12 are shown adhering to the periphery of the shaft end at the gear box opening 40. However, it will be appreciated that while the dimensions of the laser device 10 will be preselected for manufacturing, the dimensions of the bore or passageway in which it may be used will depend on the size of the machine to which the device is applied. For example, if the outside diameters of portions 18 and 19, are about 2.25 and 3.0 inches, respectively, and that of the cylinder 17 about 0.75 inches, the inner diameters of the bores may range from slightly greater than 0.75 to as much as 3.0 inches. To accommodate the various sizes of the bores, typically an adaptor of some form will be used to hold the device 10 snugly in the bore. Accordingly, a mounting ring 44, as shown in FIG. 4, may be fabricated for imposition between the outer surface of the cylinder 17 and the peripheral inner surface of the passageway 41 surrounding the opening 40 to hold the device 10 firmly engaged in the passageway. The magnetic mounting means in such instance would assist in maintaining integral movement of the device 10 with the drive shaft 42.

Figure 5:
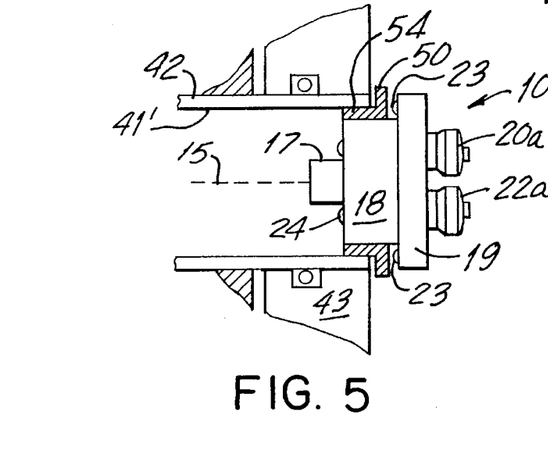
FIG. 5 is a diagram, partly in section, of a laser device of the invention showing an alternate form of arrangement for mounting the device on and in communication with the extruder barrel using a flange mounting and the outer set of magnets of FIG. 2 in this embodiment.

An alternate means for mounting the laser device 10 in the open end 40 of the drive shaft 42 of the extruder gear box 43 is shown in FIG. 5. In this embodiment, the diameter of the passageway 41' in the drive shaft 42 is greater than the outer diameter of the housing portion 18, so that, in addition to an adaptor ring 54, a flange member 50 is provided to engage the shaft end. The flange 50 may be dimensioned to accommodate the size of the passageway with the upper end of the flange engaging the shaft end on one side of the flange and the larger diameter portion 19 of the housing 12 engaging the flange lower end on the other side of the flange. The flange 50 may be of steel so that the outer set of magnets 23a–23d on portion 19 will help hold the device 10 and the adaptor (54,50) together for rotation with the shaft 42.

Figure 6:
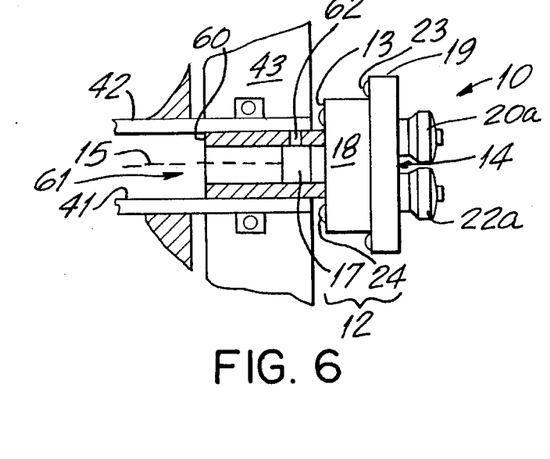
FIG. 6 is a diagram, partly in section, of a laser device of the invention showing another form of arrangement for mounting the device in the extruder barrel using a turning or tubular mounting in this instance.

A further mounting arrangement is shown in FIG. 6 wherein a metal turning or tubular extension 60, with a concentrically-drilled, laser passing hole 61 is provided on the front face 13 of the housing 12 about the cylinder 17 for insertion in the gear box opening 40. To insure the fixing of the turning 60 on cylinder 17 for rotation together, a perpendicularly arranged set screw 62 may be provided therein. Turning 60 in effect provides lengthening of the cylinder 17 in the passageway 41 and may be split to make it self-centering. In this and the other arrangements the magnetic mounting means in many situations may be dispensed with and the frictional or other gripping force between the outer and inner surfaces of the adaptor and the inner surface of the passageway and outer surface of the cylinder 17, respectively, may be relied upon to produce integral rotation between the device 10 and the shaft 42.

With the laser device 10 appropriately mounted in the passageway 41, the aperture 16 will be substantially concentric with the entrance to the passageway 41. The laser beam 15 must next be "qualified" to project precisely along the axis of the output shaft 42 of the gear box 43 and the mating bore or barrel 45 of an extruder 47. This is achieved with a photosensitive target. The target may be a known target with an appropriate known centering fixture for adjusting the center of the photosensitive cell of the target to be concentric with the axis of the barrel 45. However, a preferred self-centering target 100 is illustrated generally in FIG. 4 and is described below. A hand-held, battery operated, two-axis (vertical and horizontal) readout device 48 connected to the target can be used to immediately determine misalignment of the laser axis and the axis of rotation of the extruder in real time as explained below.

A target assembly in accordance with the invention is identified by the numeral 100 in FIGS. 7 and 10–15. The target assembly 100 comprises a target 102, a target/bore adapter 104 and an insertion/retraction pole 106.

Figure 7:
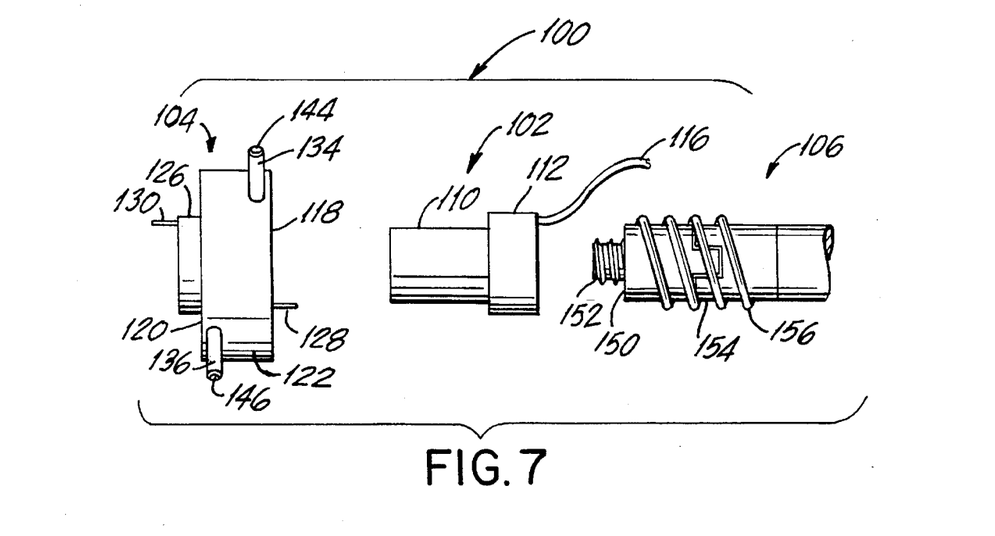
FIG. 7 is an exploded side elevational view of a target assembly in accordance with the present invention.

The target 102 includes a rigid housing 108 with a small diameter cylindrical front end 110 and a large diameter cylindrical rear end 112. The rear end 112 is formed with a milled keyway for receiving an alignment pin on the target/bore adapter 104 as explained below. The rear end 112 is further formed with a threaded aperture extending axially therein and dimensioned to securely threadedly engage the end of the insertion/retraction pole 106. The small diameter cylindrical front end 112 includes an axially aligned opening extending into the housing 108. A photoelectric cell 114 is securely mounted in the housing 108 such that the center of the photoelectric cell 114 is concentric with the axis of the cylindrical front end 110 and with the opening extending into the front end 110. The photoelectric cell 114 is operative to generate signals that are indicative of horizontal and vertical locations at which a laser beam impinges thereon. The vertical axis of the cell is aligned with the milled keyway in the housing 108. A power and signal cable 116 is connected to the photoelectric cell 114 and extends from the rear end 112 of the housing 108 to a readout device, such as the readout device 48 described and illustrated above. The cable 116 is mechanically secured to the housing 108 for permitting pulling forces to be exerted on the cable 116 without affecting the electrical connections to the photoelectric cell 114.

Figure 8:
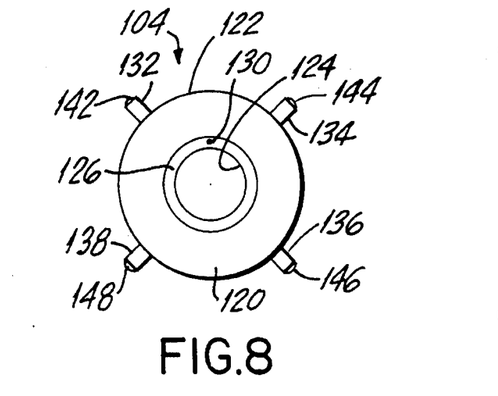
FIG. 8 is a front elevational view of the adapter of the target assembly of FIG. 7.

The target/bore adapter 104 is a short cylindrical member having opposed radially aligned first and second faces 118 and 120, an outer circumferential surface 122 and a cylindrical passage 124 extending axially between the faces 118 and 120. The passage 124 is dimensioned to slidably receive the small diameter front end 110 of the target 102. An annular flange 126 projects from the second face 120 and surrounds the passage 124. The flange 126 limits the amount of insertion of the target 102 into the passage 124. Alignment pins 128 and 130 project from the first face 118 and the second face 120 respectively. The alignment pins 128 and 130 are dimensioned and disposed to be received in the milled passageway of the large diameter end 112 of the target 102 for rotationally positioning the target 102 relative to the adapter 104.

The adapter 104 further includes legs 132, 134, 136 and 138 projecting radially outwardly therefrom at locations spaced 90° from one another. Hemispherical supports or balls 142, 144, 146 and 148 are mounted in the radially outer extremes of the respective legs 132–138. The first and second legs 132 and 134 project radially from a location on the adapter 104 in a common diametrical plane near the first radially aligned face 118 thereof. The third and fourth legs 136 and 138 project from the adapter 104 at locations in a common diametrical plane near the second radially aligned face 120 thereof. Thus, the first and second legs 132 and 134 are axially offset from the third and fourth legs 136 and 138. The opposed first and third balls 142 and 146 and the opposed second end fourth balls 144 and 148 define outside diameters "D" which are selected to exceed the inside diameter of a bore being aligned. Preferably, the diameters defined by the legs 132/136 and 134/138 are offset by 45° from the radii passing through the respective alignment pins 128 and 130. Thus the orientation of the legs 132–138 will be fixed relative to the orientation of the target 102 mounted on the alignment pins 128 or 130 of the adapter 104.

Figure 9:
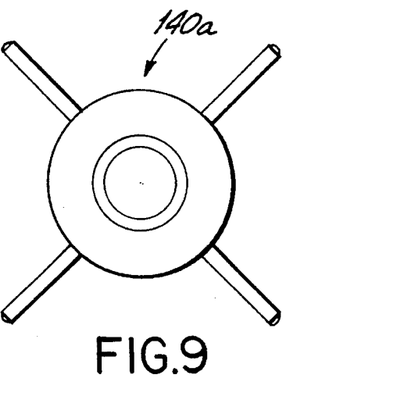
FIG. 9 is a side elevational view similar to FIG. 8, but showing an adapter for a larger diameter bore.

For different size bores, the target assembly 100 may consist of the above described target 102, the pole 106 and an alternate adapter 104a is illustrated in FIG. 9. The adapter 104a differs from the adapter 104 in that the legs are radially longer and hence the adapter 104a defines a greater outside diameter for accommodation within the larger diameter bore. The relevance of the diameter "D" of the adapter 104 or the alternate adapter 104a to the diameter of the corresponding bore is described in greater detail below.

The pole 106 is an elongate rigid structure having a mounting end 150 with a threaded projection 152 that is threadedly engageable in the above referenced aperture in the large diameter end 112 of the target 102. The pole 106 further includes a universal joint 154 that is pivotable about a diameter of the pole 106. A coil spring 156 is wrapped helically around the universal joint 154 and functions to bias the universal joint 154 into the axial alignment shown in FIG. 7. The pole 106 also includes distance measurements thereon to mark the length of insertion into a bore.

Figure 10:
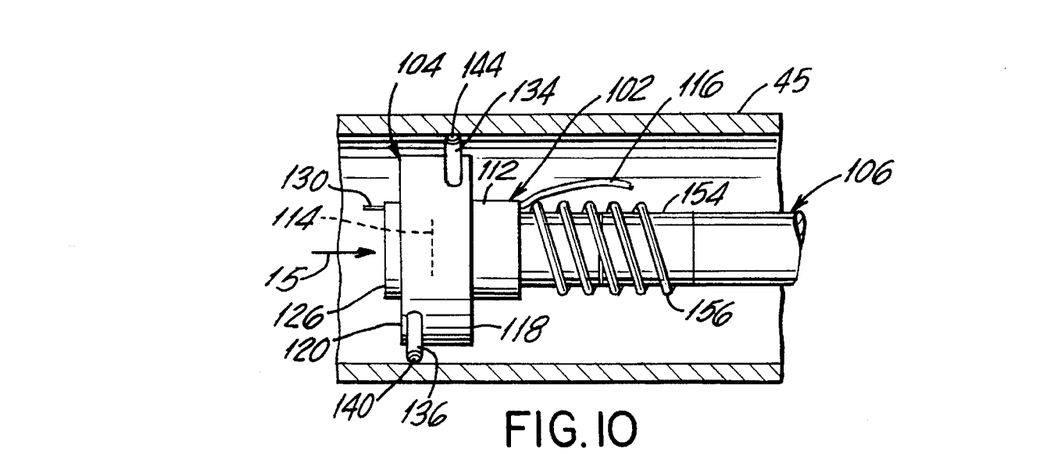
FIG. 10 is a side elevational view of the target assembly in the self-centering mode and mounted in a bore.
Figure 11:
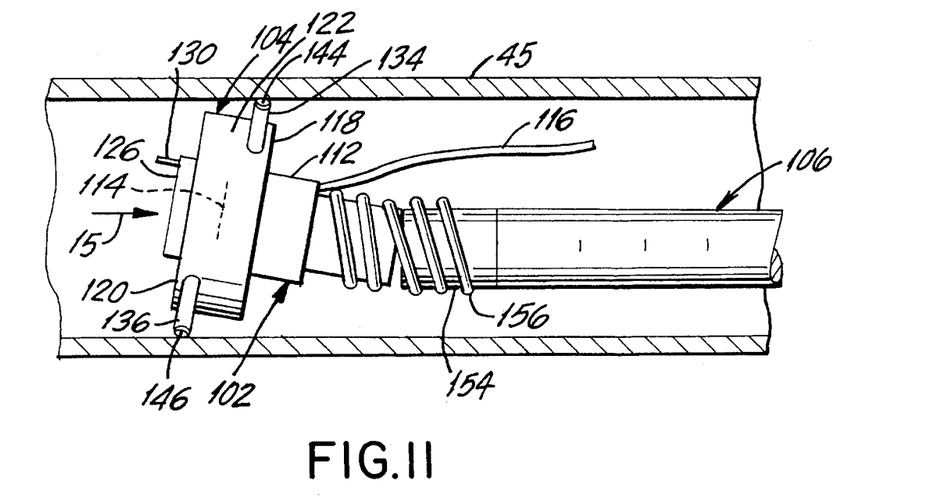
FIG. 11 is a side elevational view similar to FIG. 10 but showing a differently dimensioned bore.
Figure 12:
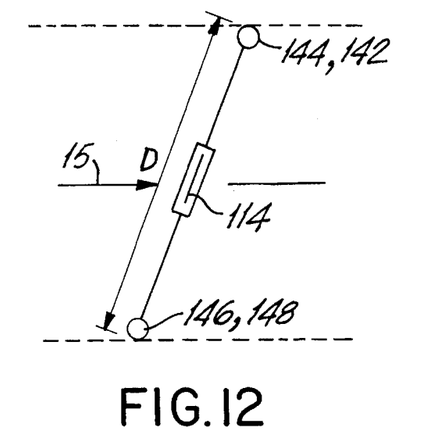
FIGS. 12 and 13 are diagrammatic views of target assemblies of FIGS. 7, 10 and 11 illustrating the "self-centering" mode.
Figure 13:
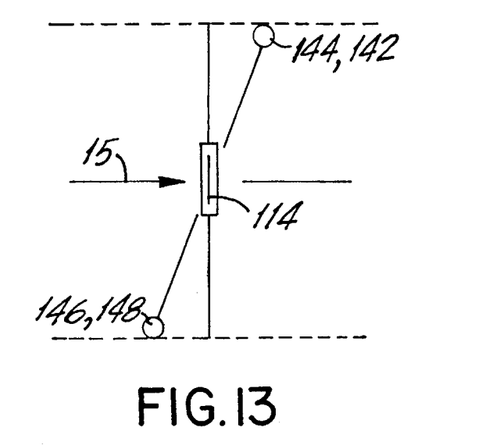

The target assembly 100 is used by threadedly engaging the projection 152 of the pole 106 into the threaded aperture in the large diameter end 112 of the target 102. The small diameter cylindrical end 110 of the target 102 is then slidably inserted into the cylindrical passage 124 through the adapter 104. The direction of insertion of the target 102 into the adapter 104 is selected in accordance with the function to be carried out by the laser alignment system. In particular, inserting the target 102 into the first side 118 of the adapter 104 positions the center of the photoelectric cell 114 exactly at the midpoint of a line passing from the ball 144 to the diametrically opposite ball 148 and at the midpoint of a line passing from the ball 142 to the diametrically opposite ball 146. This relative positioning is shown in FIGS. 10 and 11 and is further illustrated schematically in FIGS. 12 and 13. As noted above, the adapter 104 is selected to provide a diametrical dimension equal to or greater than the inside diameter of the bore being aligned. With this construction and with these relative dimensions, the center of the photoelectric cell 114 will always be positioned on the center line of the bore being aligned. This self-centered relationship exists both for situations where the faces 118 and 120 of the adapter 104 are aligned substantially orthogonally to the axis of the bore and shown in FIG. 10, and for situations where the adapter 104 must be tilted significantly to fit within the bore, as shown in FIG. 11. The two angular orientations provide the same result since the photoelectric cell 114 is insensitive to angle of incidence.

This self-centered orientation of the target 102 in the adapter 104 is used for barrel alignment procedures. In particular, the laser is mounted in the passageway 41 as described above and as shown in any of FIGS. 4–6. The target assembly 100, assembled as shown in FIGS. 10 and 11, is inserted into the end of the barrel 45. This insertion of the target assembly 100 is achieved by exerting a pulling force on the cable 116 to overcome the biasing forces exerted by the coil spring 156 and to articulate the universal joint 154 on the end of the pole 106 shown in FIG. 11. This permits the adapter 104 to define an effective cross-section smaller than the barrel 45 and enables the adapter 104 to be inserted into the barrel 45, and to be slid longitudinally to a pre-selected position. The pulling forces exerted on the cable 116 are then released, and the coil spring 156 resiliently urges the universal joint 154 toward an axially aligned position. The pole 106 can then be urged forwardly such that the opposed balls 142/146 and 144/148 are jammed into engagement with the inside diameter of the barrel 45. In this position, the photoelectric cell 114 is centered on the axis of barrel 45. The laser beam 15 generated from the laser device 10 mounted in the passageway 41 is then adjusted to center on the target. Procedurally this will require two separate readings of the laser taken at normal and inverted (NormIn) positions separated by 180°. In particular, the normal horizontal and vertical readings are taken on the self-centered target assembly 100 and with the laser device 10 in the normal orientation as indicated by one of the bubble levels 21. The gear box output shaft 42, the laser device 10 and the appropriate adapter are then rotated in unison 180° as indicated by the opposed bubble level 21, and the inverted horizontal and vertical readings are taken. The normal and inverted vertical readings are then added and split to determine the vertical set point, and the normal and inverted horizontal readings are added and then split to determine the horizontal set point. The vertical and horizontal micrometers 20a and 22b on the laser device 10 are then adjusted to the set point calculations so that the laser beam will project the calculated gear box rotational axis. The micrometers actually achieve the adjustments through their screw shafts 20b and 22b acting on optical element 82. Element 82 is a flat piece of glass mounted for rotational movement about vertical and horizontal axes, i.e., in pitch and yaw. The laser beam 15 passes through element 82 and movement of the element causes the laser beam 15 to shift either left or right with yaw movement and up or down with pitch movement parallel to the beam axis. The shifting causes the beam axis, upon passing through the lens 81, to shift with respect to the optical axis of the lens 81 thus changing its angle when exiting the lens 81. The barrel 45 is then adjusted until the target position is zeroed for both the horizontal and vertical axes. The barrel is then shimmed and clamped in this aligned position. The laser beam 15 now accurately projects along the axis of the shaft 42 and the barrel 45 and defines a precise reference line for use in bore or barrel measurement as explained below.

Figure 14:
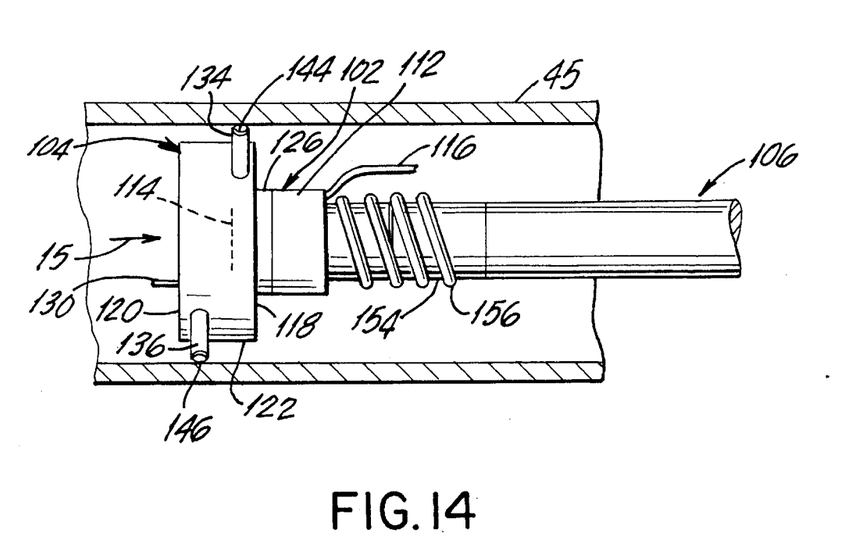
FIG. 14 is a side elevational view of the target assembly of FIG. 7 illustrating the diameter "measuring mode".
Figure 15:
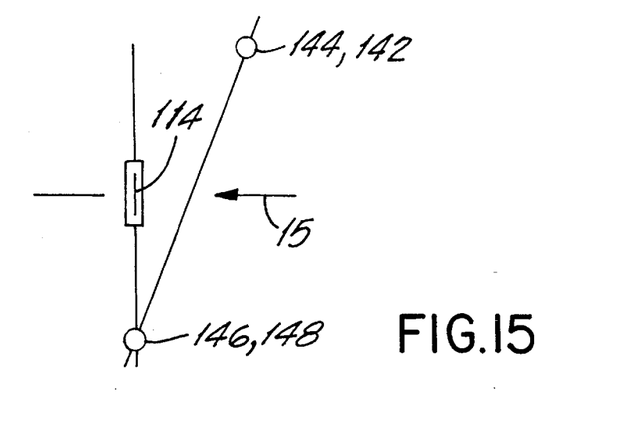
FIG. 15 is a diagrammatic view of the target assembly of FIG. 14.

The next step of the alignment procedure is to measure barrel wear at various locations along the length of the barrel. This requires precise measurements of the barrel diameter at different locations. To perform this part of the alignment procedure, the target assembly 100 is removed from the barrel 45. This is accomplished by exerting a pulling force on the cable 116 so that the universal joint 154 articulates against the biasing forces of the spring 156 to make opposed balls 142/146 and 144/148 free of their jammed engagement with the barrel 45. The technician then uses the pole 106 to remove the entire target assembly 100 from the bore. The target 102 is then removed from the first face of the adapter 104, and is inserted into the second face 120 of the adapter 104 such that the large diameter end 112 seats against the flange 126 on the second face 120 of the adapter 104. As illustrated in FIG. 14 and as shown schematically in FIG. 15, this orientation of the target 102 in the adapter 104 positions the center of the photoelectric cell 114 in a diametric plane orthogonal to the axis of the barrel 45 and passing diametrically through the balls 146 and 148. The reassembled target assembly 100 is then inserted into the barrel 45 substantially as described above by exerting a slight pulling force on the cable 116 to tilt the adapter about the universal joint 154 and urging the pole 106 axially to a first selected measurement position in the barrel 45. Pulling forces on the cable 116 are then released and the spring 156 urges the adapter 104 into a jammed engagement within the barrel 45. The pole 106 can be urged forwardly to sure jammed engagement of the adapter 104. With this orientation of the target 102 and adapter 104, the photoelectric cell 114 will substantially lie within a diametrically aligned plane orthogonal to the axis of the barrel 45. Normal and inverted readings with the target assembly 100 can be taken at several axial spaced locations along the barrel 45. These readings are compared to readings obtained at a location where the diameter is known to determine the amount of barrel wear at different locations. The amount of barrel wear will equal the difference between the target readings at the reference point and at each measured location. It will be appreciated that differences in barrel diameter will affect the angular alignment of the adapter 104 within the barrel 45. Thus, depending upon the actual barrel diameter, the photoelectric cell 114 may not be perfectly diametrically aligned within the barrel 45. However, variations in the alignment of the photoelectric cell 114 will be small and will result in "cosine errors". Thus, the magnitude of the error will vary in accordance with the cosine of the angular misalignment which will be extremely small for small angular variations and can be tolerated.

While the present invention has been described in terms of specific embodiments and combinations, it will be appreciated that the invention is not limited to the particular examples presented herein, and that the scope of the protection is defined in the attached claims.

What is claimed is:

1. A target assembly for aligning a barrel to a laser beam, said barrel having a substantially cylindrical bore therein defining an inside diameter, said target assembly comprising a rigid housing, a plurality of bore supports projecting radially outwardly from said housing and defining a maximum outside diameter greater than the inside diameter of the bore, a photoelectric cell securely mounted in the housing and being operative to generate electrical signals indicative of locations at which the laser beam impinges thereon, said photoelectric cell having a center disposed at the midpoint of the maximum outside diameter defined by the bore supports, whereby the bore supports must be angularly aligned to diameters of said bore for insertion of said target assembly into said bore and whereby the center of the photoelectric cell is disposed on the axis of the bore for any angular alignment of the bore supports relative to the bore.

2. The target assembly of claim 1, further comprising an insertion/retraction pole engaged with the target for positioning the target assembly at selected locations within the bore.

3. The target assembly of claim 2, wherein the pole includes an articulation for permitting rotational movement of the bore supports into angular alignments that permit slidable movement of the bore target assembly through the bore of the barrel.

4. The target assembly of claim 3, wherein the articulation of the pole comprises a universal joint.

5. A target assembly of claim 3, wherein the pole further includes biasing means for urging the articulation toward an axially aligned orientation.

6. The target assembly of claim 5, further comprising means for overcoming the forces exerted by the biasing means for selectively articulating the pole into an orientation for facilitating insertion of the target assembly in the bore of the barrel.

7. The target assembly of claim 6, wherein the means for overcoming the biasing means comprises a cable projecting from said housing and extending generally parallel to the pole.

8. The target assembly of claim 2, wherein the pole includes distance indicia for measuring length of insertion into the bore.

9. The target assembly of claim 1, wherein the plurality of bore supports define four bore supports separated from one another by 90°.

10. The target assembly of claim 9, wherein the photoelectric cell defines vertical and horizontal axes, the bore supports being spaced from the vertical and horizontal axes by 45°.

11. The target assembly of claim 1, further comprising a generally annular adapter having a passage therethrough for receiving the housing, the bore supports projecting generally radially outwardly from the adapter, said adapter being dimensioned to alternately position said housing in first and second positions therein, said first position being selected to dispose the center of said photoelectric cell at the midpoint on the maximum diameter defined by said bore supports, said second position being disposed to align said photoelectric cells substantially orthogonally to the axis of the bore.

12. A laser alignment assembly for an elongate barrel, said barrel having opposed first and second ends and a substantially cylindrical bore extending therebetween, said bore being generated about a longitudinal axis and having a diameter, said laser alignment assembly comprising:

a laser apparatus mountable at the first end of the barrel and being operative for directing a laser beam through the barrel; and a target assembly comprising a generally annular adapter having a passageway extending therethrough and having a plurality of bore supports projecting outwardly therefrom, said bore supports defining a maximum outside diameter greater than the diameter of the bore, such that said adapter must be tilted for insertion into the bore, a target housing releasably engageable in first and second positions within said adapter, a photoelectric cell securely mounted in the target housing and being operative to generate electrical signals indicative of locations at which the laser beam impinges thereon, said photoelectric cell having a center and being disposed in the housing such that the center is centrally disposed on the maximum diameter defined by the bore supports when the target housing is in the first position in the adapter and such that center is in a plane substantially orthogonal to the axis of the bore when the target housing is in the second position in the adapter.

13. The assembly of claim 12, further comprising an insertion/retraction pole mounted to the target housing, said pole being deflectable for permitting angular rotation of the target housing and the adapter and including biasing means for resiliently urging the pole toward an undeflected alignment.

14. A laser alignment system comprising:

laser means for producing a laser beam defining an axis, said laser means comprising a laser source and means for housing said laser source, said housing means having an outside circumference and a circular aperture in one end for passing an axis-defining laser beam from said laser source, and said aperture being concentric with the outside circumference of said housing means;

means for mounting said laser means at an opening in one end of a round axial passageway in a rotatable member, with aperture and said passageway being concentric, to admit said laser beam for aligning said laser beam axis with the axis of rotation of said rotatable member;

self-centering target means, disposed at the other end of said passageway, for sensing said laser beam; and means, in the other end of said housing means, for adjusting said laser means within said housing means to alter the position of said laser beam axis within said passageway to align said laser beam axis with said axis of rotation when said target means senses misalignment.

15. A system as in claim 14, wherein said mounting means comprises magnet means, mounted on said one end of said housing means, for magnetically adhering to said rotatable cylindrical member at said one end of said passageway.

16. A system as in claim 15, wherein said magnet means comprises a NdFeB magnet.

17. A system as in claim 14, wherein said mounting means comprises cylindrical extension means, on said one end of said housing means, for extending into said one end of said passageway.

18. A system as in claim 17, wherein said mounting means further comprises a flange on said cylindrical extension means between said one end of said housing means and the end of said rotatable member at said one end of said passageway.

19. A system as in claim 14, wherein said target means comprises a target having a center and means, connected to said target, for producing a readout signal indicative of the vertical and horizontal displacement of said laser beam from the center of said target.

20. A system as in claim 14, wherein said target means comprises:

sensing cell means for sensing a laser beam incident thereon;

support means for mounting said sensing cell means thereon and having a periphery dimensioned to fit within the diameter of said passageway for disposition therein; and four bore supports disposed on the periphery of said support means, 90° apart and in a common plane, with the outside diameter between opposing supports being dimensioned to exceed that of said passageway so that said support means, when tilted and inserted into said passageway, will jam into place at an angle with the four balls making contact with the inside diameter of said passageway.

21. A laser sensitive target assembly, for disposition in a cylindrical bore to align machine parts, comprising:

sensing cell means for sensing a laser beam incident thereon;

support means for mounting said sensing cell means thereon and having a periphery dimensioned to fit within the diameter of said bore for disposition therein; and four balls disposed on the periphery of said support means, 90° apart and in a common plane, with the outside diameter between opposing balls being dimensioned to exceed that of said bore so that said support means, when tilted and inserted into said bore, will jam into place at an angle with the four balls making contact with the inside diameter of said bore.

22. A target as in claim 21, wherein said sensing cell means is centrally disposed on said support means and in the plane of the balls to provide a self-centering of said sensing cell.

23. A target as in claim 21, wherein said sensing cell means is disposed on said support means in a plane perpendicular to the axis of said bore.

24. A target as in claim 21, further wherein said sensing cell means is disposed in a plane perpendicular to the axis of said bore and in a common plane with two of said balls.

25. A target as in claim 24, wherein said support means comprises means for switching said sensing cell means into a plane common to the plane of said four balls in a self-centered orientation in said bore.

26. A method of laser alignment comprising the steps of:
producing, with a laser source, a laser beam defining an axis;
mounting the laser source in one end of a round axial passageway of a rotatable member;
disposing a laser sensitive target centrally in barrel at a location spaced from said laser source;
directing a laser beam from said laser source toward said target;
determining first locations of impingement of the laser beam on the target;
rotating the passageway and the laser source 180° about the axis of the passageway;
determining second locations of impingement of the laser beam on the target;
adjusting the laser beam to split measured differences between the first and second locations of impingement; and
adjusting the barrel to center the barrel on the laser beam.

27. The method of claim 26, further comprising steps of:
moving the target from the central position in the barrel into a position where the target is substantially orthogonal to the laser beam;
determining locations of impingement of the laser beam on the target for normal and inverted dispositions of the laser source and the passageway at a position in the barrel of known diameter;
moving the target to at least a second position in the barrel and determining normal and inverted locations of impingement of the laser beam on the target for the first and second positions to determine variations in diameter of the barrel.

* * * * *